(12) United States Patent
Ebihara et al.

(10) Patent No.: US 8,708,343 B2
(45) Date of Patent: **\*Apr. 29, 2014**

(54) SEAL DEVICE

(75) Inventors: Hiroshi Ebihara, Tokyo (JP); Yasuhisa Arita, Tokyo (JP); Yasuhiro Ikeda, Tokyo (JP)

(73) Assignee: Eagle Industry Co., Ltd. (JP)

( * ) Notice: Subject to any disclaimer, the term of this patent is extended or adjusted under 35 U.S.C. 154(b) by 419 days.

This patent is subject to a terminal disclaimer.

(21) Appl. No.: 13/196,670

(22) Filed: Aug. 2, 2011

(65) Prior Publication Data

US 2011/0285092 A1    Nov. 24, 2011

Related U.S. Application Data

(63) Continuation of application No. 12/096,600, filed as application No. PCT/JP2006/325635 on Dec. 20, 2006, now Pat. No. 8,052,153.

(30) Foreign Application Priority Data

Mar. 8, 2006    (JP) .................................. 2006-62390

(51) Int. Cl.
   *F16J 15/32*    (2006.01)
(52) U.S. Cl.
   USPC ........................................................ 277/572
(58) Field of Classification Search
   USPC .................... 277/560, 564, 569, 572, 584
   See application file for complete search history.

(56) References Cited

U.S. PATENT DOCUMENTS

| | | | |
|---|---|---|---|
| 5,050,895 A * | 9/1991 | Hashish et al. | 277/584 |
| 6,290,470 B1 * | 9/2001 | Okuno et al. | 417/269 |
| 6,367,811 B1 | 4/2002 | Hosokawa et al. | |
| 6,517,083 B2 | 2/2003 | Yamada et al. | |
| 6,715,769 B2 | 4/2004 | Hosokawa et al. | 277/572 |
| 6,764,080 B2 | 7/2004 | Hosokawa et al. | 277/564 |

(Continued)

FOREIGN PATENT DOCUMENTS

| | | |
|---|---|---|
| JP | 1-166862 | 11/1989 |
| JP | 3-41264 | 4/1991 |

(Continued)

OTHER PUBLICATIONS

Korean Office Action (with translation) issued in corresponding application No. 10-2008-7013859, dated Apr. 25, 2013 (8 pgs).

(Continued)

*Primary Examiner* — Vishal Patel
(74) *Attorney, Agent, or Firm* — Hayes Soloway P.C.

(57) ABSTRACT

A seal device where a seal lip reliably maintains shaft sealing relative to high-pressure fluid that is to be sealed and where the equivalent Mises stress occurring in the seal lip is reduced to extend the durable term of the seal lip longer. A backup ring has a tapered section continuously extending from a fixation section of the backup ring and also has a forward end section. A rounded surface (E) with a curvature radius (R-1) is formed at least at a boundary where a surface (D) of the tapered section changes to a surface (F) of the forward end section. A portion of the surface (D) of the tapered surface, which portion is in contact with the rounded surface (E) at the boundary, is a projected curvature surface having a curvature radius greater than the curvature radius (R-1) of the boundary.

6 Claims, 10 Drawing Sheets

(56) References Cited

U.S. PATENT DOCUMENTS

| | | | |
|---|---|---|---|
| 6,840,521 B2 | 1/2005 | Ikeda | 277/551 |
| 7,467,797 B2 | 12/2008 | Oiyama et al. | 277/553 |
| 7,780,172 B2 | 8/2010 | Ashida et al. | 277/560 |
| 2002/0089125 A1 | 7/2002 | Hosokawa et al. | 277/572 |
| 2003/0075872 A1 | 4/2003 | Ikeda | |

FOREIGN PATENT DOCUMENTS

| | | | |
|---|---|---|---|
| JP | 2000-161499 | 6/2000 | |
| JP | 2001-74143 | 3/2001 | |
| JP | 2001-317636 | 11/2001 | |
| JP | 3346743 | 9/2002 | |
| JP | 2003-120821 | 4/2003 | |
| JP | 2003-120823 | 4/2003 | F16J 15/32 |
| JP | 2004-183701 | 7/2004 | |
| JP | 2005-201336 | 7/2005 | F16J 15/32 |
| JP | 2007-77937 | 3/2007 | |

OTHER PUBLICATIONS

Japanese Official Action, dated Jan. 24, 2012 and translation.
International Preliminary Report on Patentability dated Sep. 18, 2008.
International Search Report dated Jan. 12, 2007.

* cited by examiner

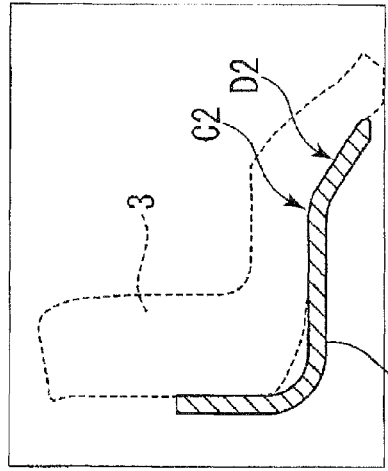
FIG. 4A COMPARATIVE EXAMPLE 1
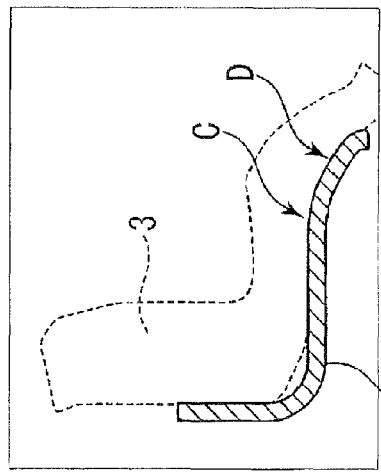
FIG. 4B COMPARATIVE EXAMPLE 2
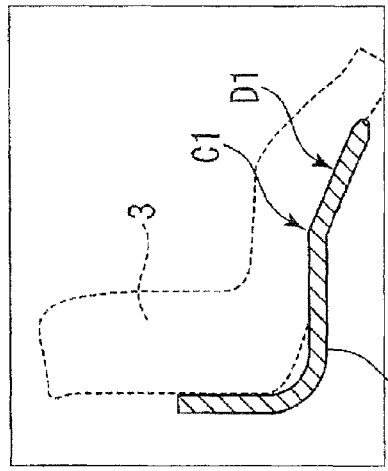
FIG. 4C COMPARATIVE EXAMPLE 3
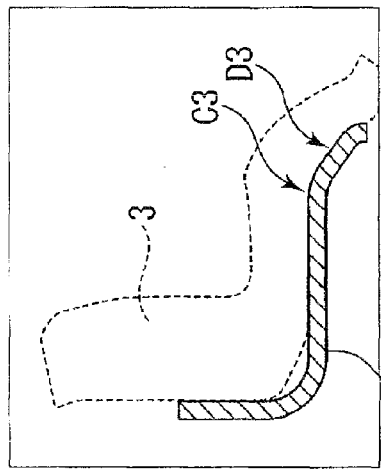
FIG. 4D PRESENT INVENTION

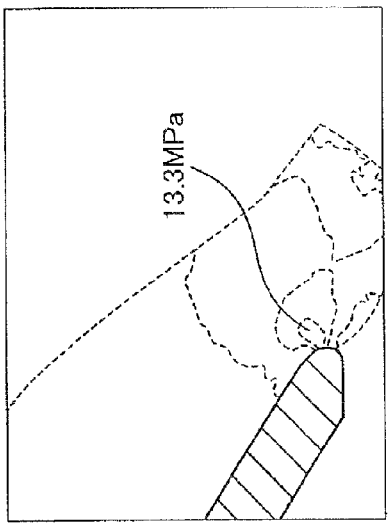
FIG. 5A COMPARATIVE EXAMPLE 1 — 15.2MPa
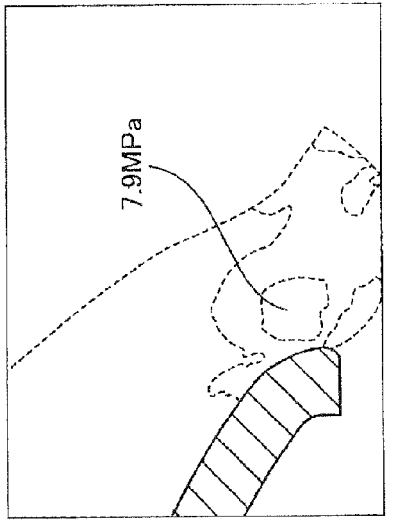
FIG. 5B COMPARATIVE EXAMPLE 2 — 13.3MPa
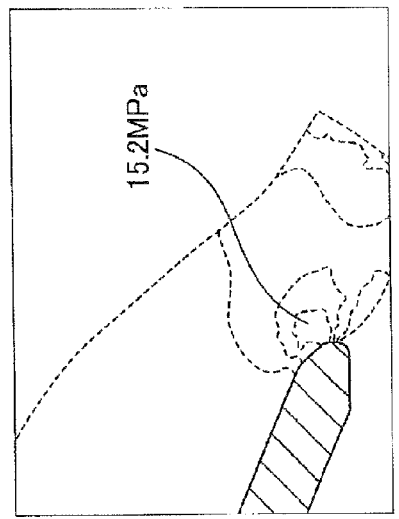
FIG. 5C COMPARATIVE EXAMPLE 3 — 8.3MPa
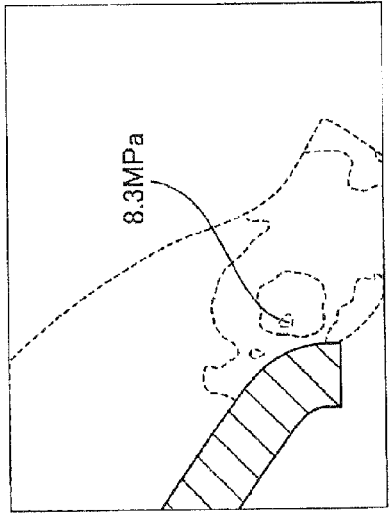
FIG. 5D PRESENT INVENTION — 7.9MPa

SEAL DEVICE

CROSS REFERENCE TO RELATED APPLICATION

This application is a continuation of U.S. patent application Ser. No. 12/096,600, filed Jun. 6, 2008, now U.S. Pat. No. 8,052,153, issued Nov. 8, 2011.

TECHNICAL FIELD

The present invention relates to a seal device for sealing a shaft, the seal device having a seal lip; and particularly relates to a seal device wherein a seal lip can establish a reliable shaft seal relative to a high-pressure coolant or another such sealed fluid, and wherein the service life of the seal lip can be extended to a longer period of time.

BACKGROUND ART

Recently, coolants used in car air conditioners and the like are being changed from CFC gas to carbon dioxide gas for the sake of environmental impact, and structures for shaft sealing carbon dioxide gas as a sealed fluid have been becoming more common. However, in cases in which carbon dioxide gas is used for the coolant, the sealed fluid that will be the coolant is set to higher pressures than have been used in the past. There has arisen an urgent need to improve the sealing strength of the shaft sealing portion, and various seal devices having high sealing strength have been developed as lip seals for compressors in car air conditioners.

One example is a lip seal device (see FIG. 10) disclosed in Utility Model Application No. 3-41264 (Patent Document 1). In this lip seal device, a backup ring 103 made of a metal material and having a ring shape is disposed between a rotating shaft 102 and an internal peripheral surface on the atmosphere side of a seal lip 101, the backup ring 103 being fitted in light contact with the internal peripheral surface of the seal lip 101. Furthermore, an annular part 104 made of a resin material is disposed in the same shape as the backup ring 103 on the atmosphere side B of the backup ring 103. Furthermore, on a fluid storage chamber side A of the backup ring 103, a seal surface 107a firmly bonded to the external peripheral surface of the rotating shaft 102 is provided to an end part 107 at which the seal lip 101 extends slantwise towards the fluid storage chamber from a proximal part 106 in which a reinforcing ring 105 is embedded, and a garter spring 108 for subjecting the seal surface 107a to tension is mounted in an annular groove provided to the external peripheral surface of the end part 107.

A ring-shaped support plate 109 is disposed on the atmosphere side of the annular part 104, and the backup ring 103, the annular part 104, and the support plate 109 are sandwiched together by a holding ring 110 whose external periphery has a U shape in cross section. These three sandwiched components collectively are a sealing part that reinforces the aligned seal lip 101.

The distance between the annular groove and the seal surface 107a at the distal end of the seal lip 101 must be reliably manufactured, but the seal lip 201 easily deforms, being made of rubber, and it is difficult to ensure the dimension of this distance when the rubber is molded. Furthermore, the backup ring 103 and the seal lip 101 must be reliably joined together, and when the backup ring 103 is pressed into the seal lip 101, the sealing capacity is compromised because the seal lip 101 is lifted up off the external peripheral surface of the rotating shaft.

To resolve this variety of problems, techniques have been developed such as those demonstrated in Japanese Patent No. 3346743 (Patent Document 2) and Japanese Laid-open Patent Application No. 2003-120821 (Patent Document 3). In the disclosed techniques, an inclined supporting part of a backup ring is press-fitted into a tapered surface in a seal lip to expand the diameter of the sealing part surface, the enlarged tapered surface of the inclined seal lip is held in pressured contact by the inclined supporting part, and the sealing part surface on the atmosphere side is maintained at a constant angle. According to this type of configuration, the sealing part surface held under tension by the backup ring is firmly bonded with sharp surface pressure to the external peripheral surface of the shaft, the sealing part surface is in contact with the shaft across a small contact surface area, the sealing capacity is effectively prevented from decreasing as a result of abnormal deformation in which the sealing part surface is jammed, the state of the sealing corner being in contact under sharp surface pressure is maintained, and excellent sealing capacity is exhibited.

Patent Document 1: Utility Model Application No. 3-41264 (pg. 1, FIG. 1)
Patent Document 2: Japanese Patent No. 3346743 (pg. 2, FIG. 2)
Patent Document 3: Japanese Laid-open Patent Application No. 2003-120821 (pg. 2, FIG. 1)

DISCLOSURE OF THE INVENTION

Problems to be Solved by the Invention

However, in conventional techniques such as those disclosed in Japanese Patent No. 3346743 (Patent Document 2) and Japanese Laid-open Patent Application No. 2003-120821 (Patent Document 3), when a large amount of sealed fluid pressure is applied to the external periphery of the rubber seal lip, the seal lip is pressed towards the rotating shaft, and excessive stress is created between the corner where the tapered surface of the backup ring folds back toward the rotating shaft and the sealing inside surface of the seal lip. An extremely large amount of equivalent Mises stress is created in the seal lip located at the corner of the backup ring, and with long-term use, there is a danger that the seal lip will suffer fractures. In practice, although roundness (R) is formed in the corner of the backup ring described above and efforts are made to reduce the equivalent Mises stress created in the seal lip, yet a further reduction in the equivalent Mises stress is desired.

The present invention was designed in view of problems such as those described above, and an object thereof is to provide a seal device wherein a seal lip can maintain a reliable shaft seal relative to a high-pressure sealed fluid, the equivalent Mises stress created in the seal lip can be reduced, and the service life of the seal lip can be extended to a longer period of time.

Means for Solving these Problems

To solve these problems, the seal device according to a first aspect of the present invention is a seal device having a backup ring protruding towards a fluid storage chamber so as to enclose a rotating shaft, wherein at least the backup ring has a tapered shape, and a distal end of a seal lip supported by the backup ring is capable of coming into contact with the rotating shaft; the seal device characterized in that the backup ring has a tapered part and a distal end part extending continuously from a fixed part thereof; a rounded surface having a curvature radius (R-1) is formed at least in a boundary where a surface of the tapered part changes to a surface of the distal end; and part of the surface of the tapered part adjacent to the rounded surface at the boundary is a convex surface having a curvature radius greater than the curvature radius (R-1) of the boundary.

According to these characteristics, pressure from the fluid storage chamber side acts on the seal lip, and the lip distal end is pressed against the rotating shaft, while pressing force from the seal lip is exerted on the backup ring at the same time. The seal lip in particular then comes firmly into contact with the boundary (corner of the backup ring) where the surface of the tapered part of the backup ring changes to the surface of the distal end, and there is a tendency for an extremely large amount of equivalent Mises stress to accumulate at this location. However, according to the present invention, since a surface that is not a straight linear surface and that has a comparatively large curvature radius is formed in part of the surface of the tapered part connected to the rounded surface at the boundary, the swelled roundness (curvature radius) of at least part of the tapered part contributes to increasing the surface area of the tapered part of the backup ring for holding the seal lip, and although pressure from the fluid storage chamber acts on the seal lip due to the increase in frictional force of this enlarged contact surface, slight misalignments are effectively prevented from occurring between the seal lip and the tapered surface of the backup ring. Therefore, an extreme amount of equivalent Mises stress does not accumulate in the seal lip located at the boundary (corner of the backup ring) where the surface of the tapered part of the backup ring changes to the surface of the distal end, the equivalent Mises stress occurring in the seal lip can be reduced while a reliable shaft seal is maintained by the seal lip, and the service life of the seal lip can be extended to a longer period of time.

The seal device according to a second aspect of the present invention is a seal device having a backup ring protruding towards a fluid storage chamber so as to enclose a rotating shaft, wherein at least the backup ring has a tapered shape, and a distal end of a seal lip supported by the backup ring is capable of coming into contact with the rotating shaft; the seal device characterized in that the backup ring has a tapered part and a distal end part extending continuously from a fixed part thereof; a rounded surface having a curvature radius (R-1) is formed at least in a boundary where a surface of the tapered part changes to a surface of the distal end; and the surface of the tapered part is a convex surface having a substantially constant curvature radius (R-2) greater than the curvature radius (R-1) of the boundary.

According to these characteristics, the surface of the tapered part is a tapered surface having a tapered end and a substantially constant curvature radius (R-2) greater than the curvature radius (R-1) of the boundary, whereby the curvature radius (R-2) contributes to increasing the surface area of the tapered part of the backup ring for holding the seal lip, and although pressure from the fluid storage chamber acts on the seal lip, slight misalignments can be effectively prevented from occurring between the seal lip and the tapered surface of the backup ring. Therefore, an extreme amount of equivalent Mises stress does not accumulate in the seal lip located at the boundary (corner of the backup ring) where the surface of the tapered part of the backup ring changes to the surface of the distal end, the equivalent Mises stress occurring in the seal lip can be reduced while a reliable shaft seal is maintained by the seal lip, and the service life of the seal lip can be extended to a longer period of time.

The seal device according to a third aspect of the present invention is the seal device according to the second aspect, the seal device characterized in that the backup ring has a protruding part extending continuously from a fixed part thereof, wherein the surface of the protruding part is substantially parallel to the rotating shaft; and the boundary where the surface of the protruding part changes to the surface of the tapered part is a rounded surface having a curvature radius equal to or greater than the curvature radius (R-2) of a tapered surface which is the surface of the tapered part.

According to these characteristics, in conventional practice, when a curved part having a comparatively small curvature radius is present in the boundary where the surface of the protruding part changes to the surface of the tapered part in the backup ring, fluctuations in the internal pressure of the fluid storage chamber are likely to cause the seal lip to detach from the backup ring at this curved part, and slight misalignments occur more readily between the seal lip and the tapered surface of the backup ring. However, according to the configuration described above, a boundary can be formed where the surface of the protruding part gently changes to the surface of the tapered part; therefore, there is no extremely curved part, and slight misalignments can be effectively prevented from occurring between the seal lip and the tapered surface of the backup ring.

The seal device according to a fourth aspect of the present invention is a seal device having a backup ring protruding towards a fluid storage chamber so as to enclose a rotating shaft, wherein at least the backup ring has a tapered shape, and a distal end of a seal lip supported by the backup ring is capable of coming into contact with the rotating shaft; the seal device characterized in that the backup ring has a tapered part and a distal end part extending continuously from a fixed part thereof; a rounded surface having a curvature radius (R-1) is formed at least in a boundary where a surface of the tapered part changes to a surface of the distal end; and the surface of the tapered part is a convex surface that has no linear surfaces and that is composed of a combination of a plurality of different curvature radii greater than the curvature radius (R-1) of the boundary.

According to these characteristics, the surface of the tapered part is a tapered surface having a tapered end and having no straight linear surfaces, the surface being composed of a combination of a plurality of different curvature radii greater than the curvature radius (R-1) of the boundary, whereby the curvature can be varied so as to adapt to the pressure distribution inside the fluid storage chamber, and slight misalignments can be effectively prevented from occurring between the seal lip and the tapered surface of the backup ring.

The seal device according to a fifth aspect of the present invention is the seal device according to any of the first through fourth aspects, characterized in that an inside end surface substantially parallel to the rotating shaft is formed in the distal end of the backup ring; and a rounded surface having a curvature radius (R-0) less than that of the rounded surface having the curvature radius (R-1) is formed in the boundary where the surface of the distal end changes to the inner end surface.

According to these characteristics, the seal lip is not damaged at the corner of the inside end surface of the distal end of the backup ring.

The seal device according to a sixth aspect is the seal device according to any of the first through fifth aspects, characterized in that the inside surface of the seal lip, which is supported by the backup ring having the protruding part, the tapered part, and the distal end part extending continuously from the fixed part, is formed in advance, at least when the seal lip is molded, as a concave surface to fit with the convex surface of the tapered part of the backup ring.

According to these characteristics, the seal lip is formed in advance as a concave rounded surface for fitting with the convex rounded surface of the tapered part of the backup ring; therefore, slight misalignments can be effectively prevented from occurring between the seal lip and the tapered surface of the backup ring, depending on the material strength of the seal lip itself.

BRIEF DESCRIPTION OF THE DRAWINGS

FIG. 4 contains drawings showing the measurement (Test 1) of the equivalent Mises stress achieved with the backup ring, and an experiment (Test 2) for evaluating the likelihood of the seal lip to break;

FIG. 5 contains drawings showing the results of Test 1;

Figure 1:
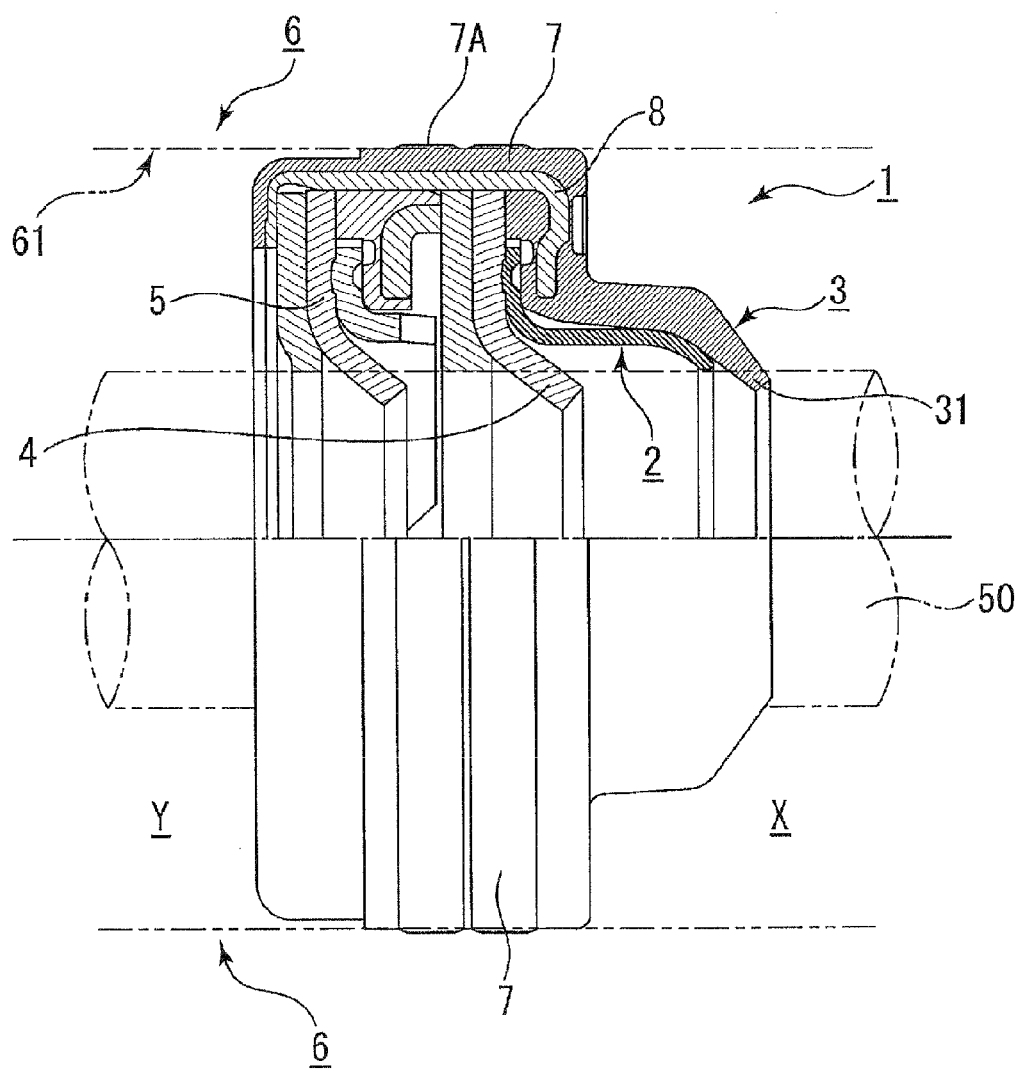
FIG. 1 is a semi-cross-sectional view of the seal device in the first embodiment of the present invention.

KEY 1 seal device
2 backup ring
3 seal lip
4 seal lip
5 seal lip
6 housing
7 fitting part
7A sealing portion
8 reinforcing ring
21 fixed part
22 protruding part
23 tapered part
24 distal end
26 boundary
27 inside end surface
29 boundary
31 lip distal end
32 concave surface
50 rotating shaft
61 fitting hole

BEST MODE FOR CARRYING OUT THE INVENTION

Embodiments of the present invention are described hereinbelow.

EMBODIMENTS

Figure 2:
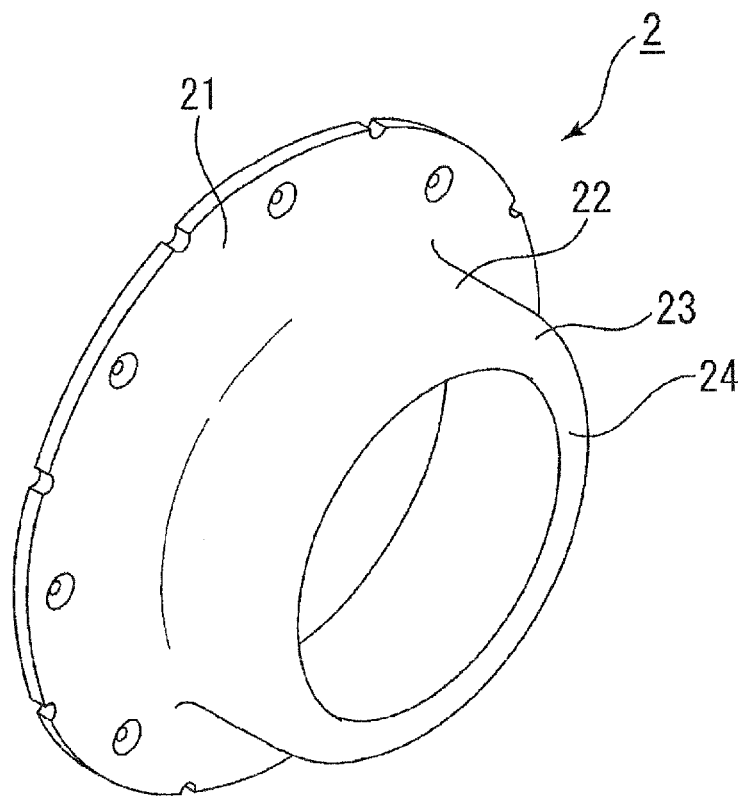
FIG. 2 is a perspective view of the backup ring.
Figure 3:
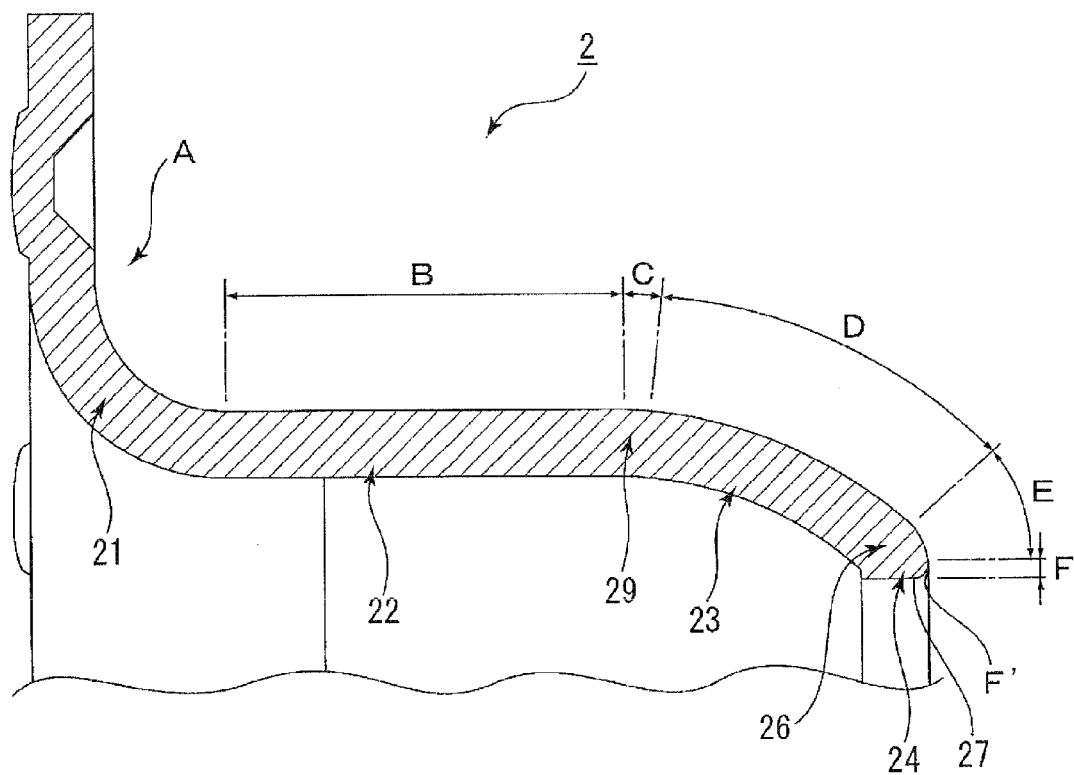
FIG. 3 is a cross-sectional view of the top half of the backup ring.
Figure 6:
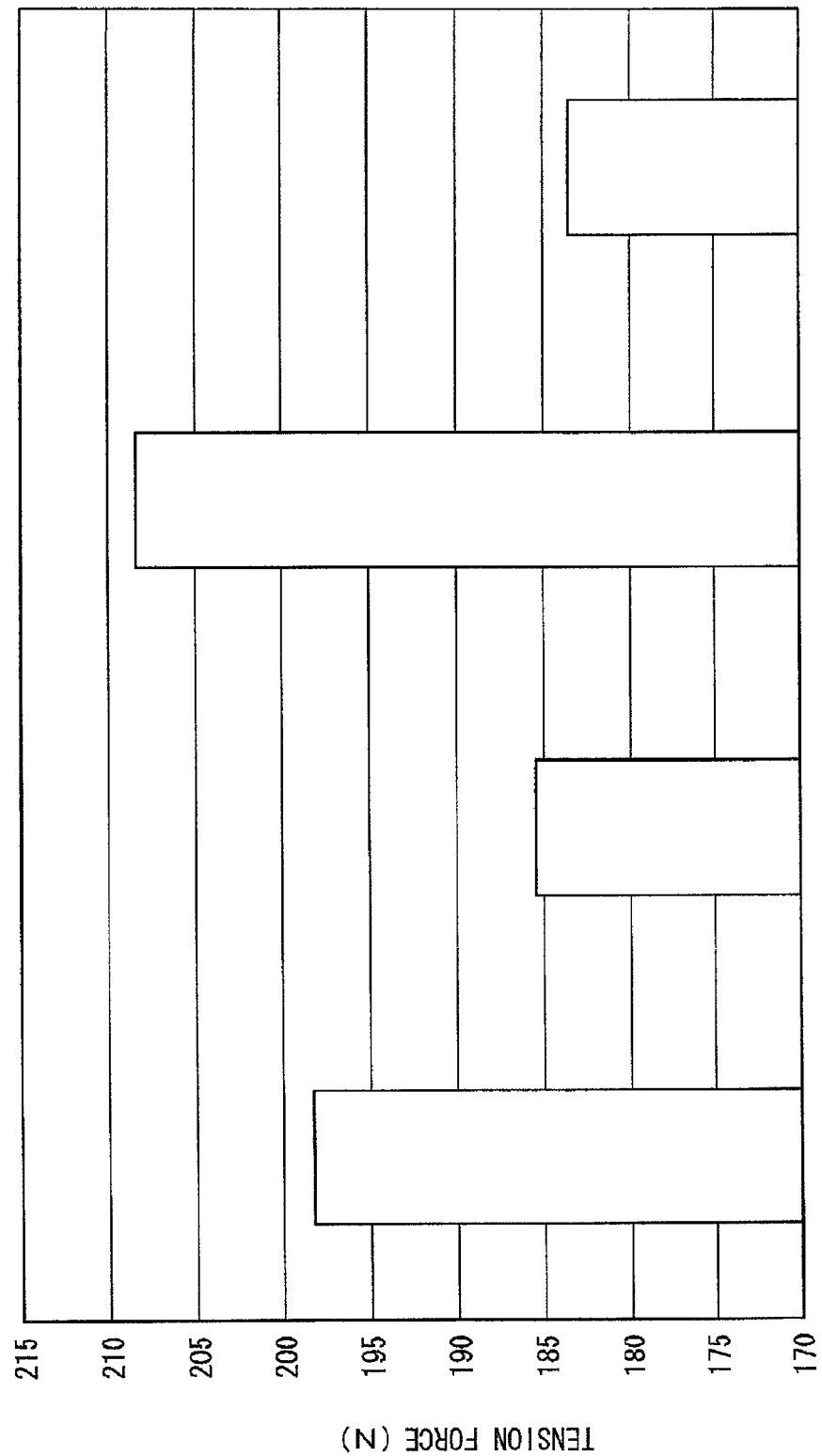
FIG. 6 is a diagram showing the results of Test 2.
Figure 7B:
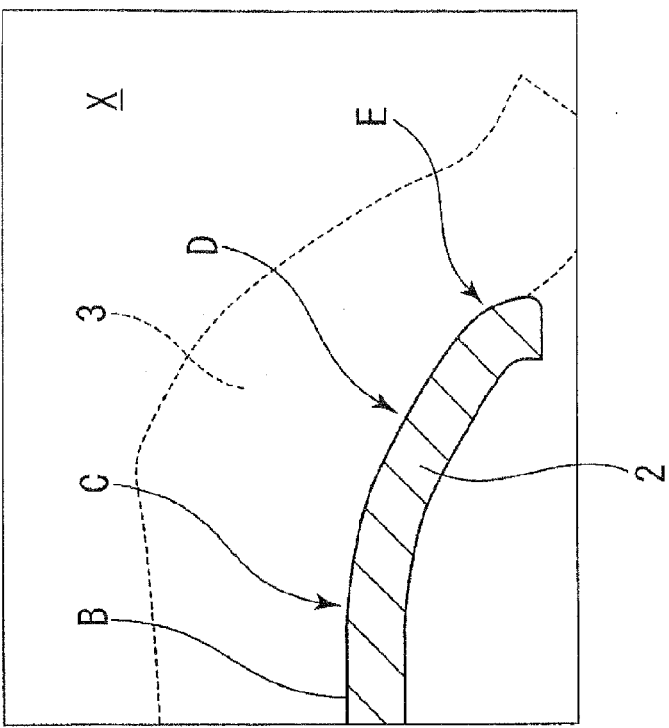
FIG. 7 contains drawings comparing the backup rings of the first embodiment and Comparative Example 3.
Figure 7A:
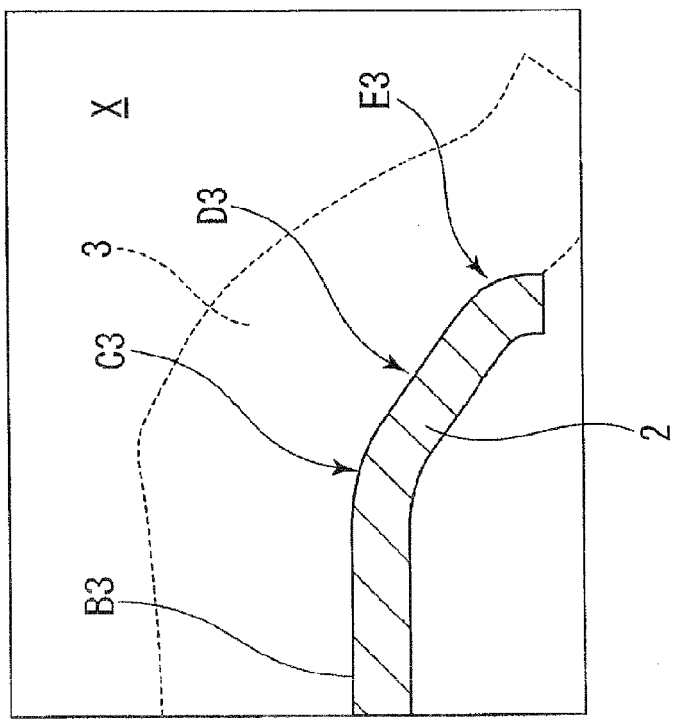
Figure 8:
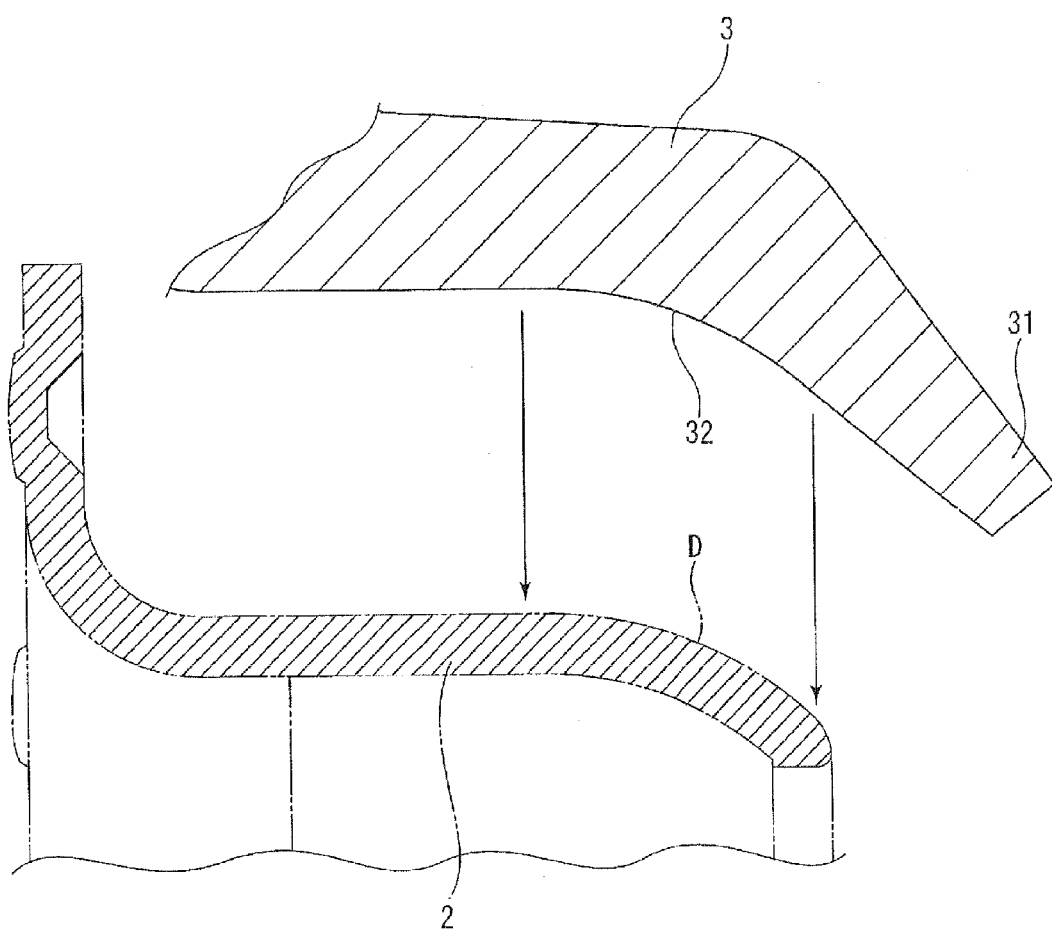
FIG. 8 is a drawing showing the structure of the seal lip.
Figure 9:
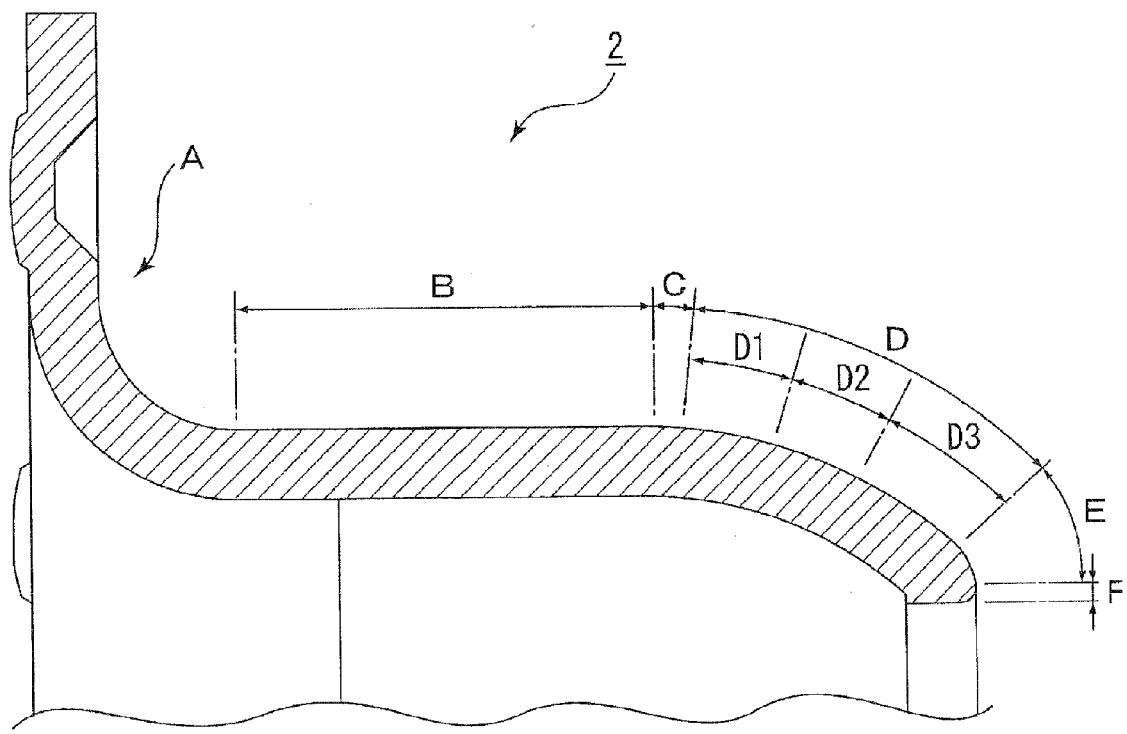
FIG. 9 is a drawing showing the seal device of the second embodiment.
Figure 10:
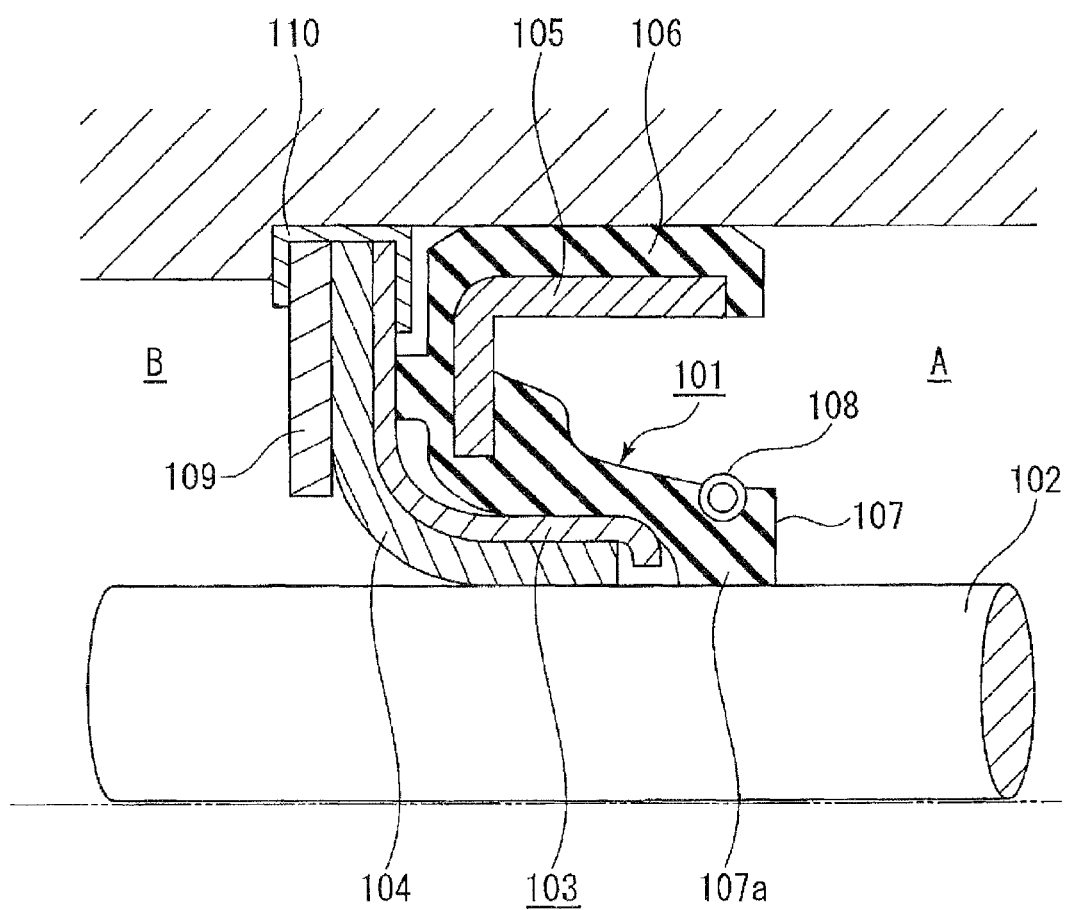
FIG. 10 is a drawing showing the lip seal device disclosed in Utility Model Application No. 3-41264 (Patent Document 1).

Embodiments of the present invention shall be described with reference to the drawings. First, FIG. 1 is a semi-cross sectional view of the seal device in the first embodiment of the present invention. FIG. 2 is a perspective view of the backup ring. FIG. 3 is a cross-sectional view of the top half of the backup ring. FIG. 4 contains drawings showing the measurement (Test 1) of the equivalent Mises stress achieved with the backup ring, and an experiment (Test 2) for evaluating the likelihood of the seal lip to break. FIG. 5 contains drawings showing the results of Test 1. FIG. 6 is a diagram showing the results of Test 2. FIG. 7 contains drawings comparing the backup rings of the first embodiment and Comparative Example 3. FIG. 8 is a drawing showing the structure of the seal lip. FIG. 9 is a drawing showing the seal device of the second embodiment. FIG. 10 is a drawing showing the lip seal device disclosed in Utility Model Application No. 3-41264 (Patent Document 1).

FIG. 1 shows the seal device of the first embodiment according to the present invention, and is a semi-cross-sectional view of a state in which the seal device is not attached to a shaft. In FIG. 1, the numerical symbol 1 denotes a seal device installed between an atmosphere Y side and a fluid storage chamber X side, and this seal device 1 is provided with a rubber fitting part 7 for fitting into a fitting hole 61 in a housing 6. A convex-shaped sealing portion 7A is formed on the external peripheral surface of the fitting part 7. A reinforcing ring 8 is embedded within the fitting part 7. The fitting with the housing 6 is strengthened by this reinforcing ring 8, and a second seal lip 4 and third seal lip 5 are held by the fitting part 7.

A rubber seal lip 3 is formed into a cylinder shape that slants from the fitting part 7 towards a rotating shaft 50, with the reinforcing ring 8 interposed therebetween. A lip distal end 31 of the seal lip 3 constitutes a sealing function surface and exhibits a sealing capability by increasing surface pressure when optimally bonded to the rotating shaft 50.

The side of the seal lip 3 that faces the fluid storage chamber X from the fitting part 7 is provided with a backup ring 2 having a shape substantially resembling the seal lip 3 along the surface of the seal lip 3. This backup ring 2 is formed to a thickness that is pressure-resistant enough to not deform despite the pressure of the sealed fluid acting on the seal lip 3.

In the seal device 1 of the first embodiment, the backup ring 2, which protrudes towards the fluid storage chamber X so as to enclose the rotating shaft, has a tapered shape in at least the front portion of the backup ring as shown in FIGS. 1 and 2, and the lip distal end 31 of the seal lip 3 supported by the backup ring 2 is capable of being in contact with the rotating shaft 50. The backup ring 2 of the seal device 1 has a fixed part 21, which is a portion fixed to the seal device 1 due to being sandwiched by the second seal lip 4 and the rubber seal lip 3 supported by the reinforcing ring 8.

Furthermore, the backup ring 2 has a protruding part 22, a tapered part 23, and a distal end part 24 which extend continuously from the fixed part 21. FIG. 3 shows a cross-sectional view of the top half of the backup ring 2, wherein the surfaces of the parts are shown sequentially as a surface A of the fixed part 21, a surface B of the protruding part 22, a surface D of the tapered part 23, and a surface F of the distal end 24. A rounded surface F having a curvature radius (R-1) is formed at least on a surface of a first boundary 26 where the surface D of the tapered part 23 changes to the surface F of the distal end 24, and a rounded surface C having a curvature radius (R-3) is formed on a surface of a second boundary 29 where the surface B of the protruding part 22 changes to the surface D of the tapered part 23. In the seal device of the first embodiment, the entire surface D of the tapered part 23 in particular is formed into a tapered surface composed of a convex surface having a substantially constant curvature radius (R-2) greater than the curvature radius (R-1) of the rounded surface E of the first boundary 26. Furthermore, the rounded surface C, which is the surface of the second boundary 29 where the surface B of the protruding part 22 changes to the surface D of the tapered part 23, is also formed into a convex surface having the same curvature radius (R-2) as the curvature radius (R-2) of the surface D of the tapered part 23. In this case, when the curvature radius (R-3) of the rounded surface C and the curvature radius (R-2) of the surface D of the tapered part 23 are the same curvature radii, the rounded surface C and the surface D of the tapered part 23 are easily worked, and the surface B of the protruding part 22 can change to the surface D of the tapered part 23 via merely a slightly curved surface.

Without being limited to the present embodiment, it is sufficient to form a convex surface having a curvature radius (R-2) greater than the curvature radius (R-1) of the rounded surface F of the first boundary 26 on only part of the surface D of the tapered part 23 that continues to the rounded surface E, which is the surface of the first boundary 26. Specifically, in the present invention, a straight surface in the surface D of the tapered part 23 need only be made as small as possible, and the swelled roundness (curvature radius) of at least part (or all) of the tapered surface of the backup ring 2 can contribute to increasing the surface area of the tapered surface of the backup ring 2 for holding the seal lip 3.

In cases in which a convex surface having a curvature radius (R-2) greater than the curvature radius (R-1) of the rounded surface E of the first boundary 26 is formed in only part of the surface D of the tapered part 23, it is more preferable to form a convex surface having a curvature radius (R-2) greater than the curvature radius (R-1) of the rounded surface E in the part of the surface D of the tapered part 23 near to the rounded surface E, because this convex surface will be likely to affect the proximity of the rounded surface E.

Furthermore, an inside end surface 27 substantially parallel to the rotating shaft 50 is formed in the distal end 24 of the backup ring 2, and a rounded surface F' having a curvature radius (R-0) less than the curvature radius (R-1) of the rounded surface E of the first boundary 26 is formed in the portion where the surface F of the distal end 24 changes to the inside end surface 27. Regarding the distal end 24, the surface F of the distal end 24 is oriented essentially perpendicular to the rotating shaft 50, and instead of providing a perpendicular surface thereto, the surface F of the distal end 24 may be a curved surface where the rounded surface E having a curvature radius (R-1) changes directly to the rounded surface F' having a curvature radius (R-0). The result of the presence of at least the rounded surface F' having a curvature radius (R-0) is that the seal lip 3 is not damaged by the corner formed at the inside end surface of the distal end 24 of the backup ring 2.

In the seal device of the first embodiment, as suitable examples, the curvature radius (R-0) of the rounded surface F' is 0.1 mm, the curvature radius (R-1) of the rounded surface E is 0.4 mm, the curvature radius (R-2) of the surface D is 3.0 mm, and the curvature radius (R-3) of the rounded surface C is 3.0 mm.

In the backup ring 2 in the seal device of the first embodiment, the surface B of the protruding part 22 extending continuously from the fixed part 21 is substantially parallel to the rotating shaft 50, and the rounded surface C, which is the surface of the second boundary 29 where the surface B of the protruding part 22 changes to the surface D of the tapered part 23, may be a rounded surface having a curvature radius (R-3) greater than the curvature radius (R-2) of the surface D of the tapered part 23. Furthermore, the shape of the fixed part 21 is arbitrary, and not only is there no need for the surface B of the protruding part 22 to be substantially parallel to the rotating shaft 50, but there is also no need to separately distinguish between the fixed part 21 and the protruding part 22.

Generally, as previously described, in cases in which a large amount of sealed fluid pressure is applied to the external periphery of the rubber seal lip 3, the seal lip 3 is pushed in the axial direction of the rotating shaft 50, excessive stress is created between the sealing internal surface of the seal lip 3 and the corner (proximity of the rounded surface E) where the tapered surface of the backup ring 2 folds back towards the rotating shaft, and the equivalent Mises stress is applied to the seal lip 3 located in proximity to the rounded surface E. Measurements were taken (Test 1) of the equivalent Mises stress achieved with the backup ring 2 of the seal device (present invention) of the first embodiment, and of the equivalent Mises stress achieved when a differently structured backup ring of Comparative Examples 1, 2, and 3 was used; and an experiment (Test 2) was conducted for evaluating the likelihood of the seal lip to break when subjected to pressure fluctuations and variations in temperature conditions, as shown in FIG. 4.

(1) In Comparative Example 1 of the backup ring, a rounded surface C1 is a corner having substantially no roundness, and a surface D1 is a flat surface having substantially no roundness. (2) In Comparative Example 2 of the backup ring, a rounded surface C2 has a curvature radius of 1.5 mm, and a surface D2 is a flat surface having substantially no roundness. (3) In Comparative Example 3 of the backup ring, a rounded surface C3 has a curvature radius of 1.0 mm, and a surface D3 is a flat surface having substantially no roundness.

For the test conditions of Test 1, hot water was kept at a temperature of 200° C., a pressure of 8 MPa was applied as the pressure of the sealed fluid, and the maximum equivalent Mises stress at the lip distal end due to the shapes of the backup rings was outputted as the result of FEM analysis.

For the test conditions of Test 2, hot water was kept at a temperature of 220° C., the pressure fluctuation range was set to 2 MPa, pressures of 6 MPa and 8 MPa were alternately applied, and the pulse frequency was set to 2400 times. Furthermore, for the eccentricity of the shaft, the axial eccentricity was set to 0.3 mm, and the likelihood of the seal lip to break due to the shapes of the backup rings was evaluated.

For the results of Test 1, the maximum equivalent Mises stress at the lip distal end in Comparative Example 1 was 15.2 MPa, the maximum equivalent Mises stress at the lip distal end in Comparative Example 2 was 13.3 MPa, the maximum equivalent Mises stress at the lip distal end in Comparative Example 3 was 8.3 MPa, and the maximum equivalent Mises stress at the lip distal end in the seal device (present invention) of the first embodiment was 7.9 MPa, as shown in FIG. 5. Furthermore measuring the tension force (N) also confirmed that the seal device (present invention) of the first embodiment had a tension force (N) of about 184 N, which was less than the comparative examples, and the seal device was resistant to generated heat, as shown in FIG. 6.

The results of Test 2 showed that breakage occurred in all of the seal lips in the other Comparative Examples 1, 2, and 3, whereas no breakage occurred in the seal lip of the seal device (present invention) of the first embodiment, and it was clear that the equivalent Mises stress in the seal lip could be reduced.

Referring to FIG. 7, the backup ring of the seal device of the first embodiment is compared with the backup ring of Comparative Example 3, which comparatively resembles the first embodiment. Generally, when pressure from the fluid storage chamber X side acts on the seal lip 3, the lip distal end is pressed against the rotating shaft, while at the same time, pressing force from the seal lip 3 is exerted on the backup ring 2. The seal lip 3 in particular then comes firmly into contact with the boundary (corner of the backup ring) where the surface of the tapered part of the backup ring 2 changes to the surface of the distal end, and there is a tendency for an extremely large amount of equivalent Mises stress to accumulate at this location.

According to FIG. 7, the surface D3 in the tapered part of the backup ring 2 in Comparative Example 3 is formed into a straight linear surface. Furthermore, the rounded surface C3 is formed at the boundary between the surface B3 of the protruding part, which is a straight linear surface extending continuously from the fixed part, and the surface D3 of the tapered part, which is a straight linear surface. In the backup ring 2 used in the seal device of the first embodiment, a surface that is not straight and linear and that has a comparatively large curvature radius is formed through all (or part) of the surface D of the tapered part.

As is clear from the results of the comparative tests described above, the swelled roundness (curvature radius) of at least part (or all) of the tapered surface of the backup ring 2 used in the seal device of the first embodiment contributes to increasing the surface area of the tapered surface of the backup ring 2 for holding the seal lip 3, and although pressure from the fluid storage chamber X acts on the seal lip 3 as a result of the frictional force of this enlarged contact surface, slight misalignments are effectively prevented from occurring between the seal lip 3 and the tapered surface of the backup ring 2. Therefore, an extreme amount of equivalent Mises stress does not accumulate in the seal lip located at the rounded surface E of the first boundary 26 where the surface of the tapered part of the backup ring changes to the surface of the distal end, the equivalent Mises stress occurring in the seal lip 3 can be reduced while a reliable shaft seal is maintained by the seal lip 3, and the lip can be given a longer service life than that of conventional products.

Particularly, in the seal device of the first embodiment, the entire surface D of the tapered part 23 is formed into a tapered surface having a tapered end and composed of a convex surface having a substantially constant curvature radius (R-2) greater than the curvature radius (R-1) of the rounded surface E of the first boundary 26. Furthermore, the rounded surface C, which is the surface of the second boundary 29 where the surface B of the protruding part 22 changes to the surface D of the tapered part 23, is also a convex surface having the curvature radius (R-2). In this case, the curvature radius (R-3) of the rounded surface C and the curvature radius (R-2) of the surface D of the tapered part 23 are the same curvature radius.

The backup ring 2 is easily manufactured if the curvature radius (R-3) of the rounded surface C and the curvature radius (R-2) of the surface D of the tapered part 23 are the same curvature radius, but, not being limited to this option alone, the rounded surface C can also have a curvature radius (R-3) greater than the curvature radius (R-2) of the tapered surface, which is the surface of the tapered part.

Particularly, in the backup ring 2 of Comparative Example 3 or the like, the rounded surface C3 is realized as a comparatively conspicuous curved part in the boundary between the surface B3 of the protruding part, which is a straight linear surface extending continuously from the fixed part, and the surface D3 of the tapered part, which is a straight linear surface. If the curved part having a comparatively small curvature radius is present in this manner, fluctuations in the internal pressure of the fluid storage chamber are likely to cause the seal lip 3 to detach from the backup ring 2 at this curved part, and slight misalignments are likely to occur between the seal lip 3 and the tapered surface of the backup ring 2. However, in the seal device of the first embodiment, the surface D of the tapered part already extends in a specific curvature radius, and a boundary is formed where the surface D of the tapered part gently changes to the surface B of the protruding part; therefore, there is no extremely curved part, and slight misalignments can be effectively prevented from occurring between the seal lip 3 and the tapered surface of the backup ring 2.

FIG. 8 shows the structure of the seal lip 3, wherein the inside surface of the seal lip 3, which is supported by the backup ring 2 having a protruding part, a tapered part, and a lip distal end part 31 extending continuously from the fixed part, is formed in advance as a concave surface 32 to fit with the convex curvature of the surface D of the tapered part of the backup ring 2, at least during the molding of the seal lip 3. When the seal lip 3 is formed in advance as a concave surface 32 to fit with the convex surface D of the tapered part of the backup ring 2, the concave surface 32 of the seal lip 3 and the convex surface D of the tapered part thus fit together in the usual state of pressure as well. Furthermore, the seal lip 3 is less prone to deformation than a conventional seal lip having a straight linear surface on the inside surface, and slight misalignments can be effectively prevented from occurring between the seal lip 3 and the tapered surface of the backup ring 2, depending on the material strength of the seal lip 3 itself.

FIG. 9 shows the seal device of the second embodiment, which is different from the seal device of the first embodiment in that in the seal device of the first embodiment, the entire surface D of the tapered part 23 in particular is formed into a tapered surface having a tapered end composed of a convex surface having a substantially constant curvature radius (R-2) greater than the curvature radius (R-1) of the rounded surface E of the first boundary 26. In the seal device of the second embodiment, however, the surface D of the tapered part 23 is composed of surfaces D1, D2, D3 . . . having different curvature radii that are greater than the curvature radius (R-1) of the first boundary, and the surface D of the tapered part 23 is a tapered surface having a tapered end with no straight linear surfaces, the surface being composed of a combination of different curvature radii. The curvature of the surface D of the tapered part 23 can be varied greatly by combining the surfaces D1, D2, D3 of different curvature radii so as to adapt to the pressure distribution inside the fluid storage chamber, and slight misalignments can therefore be prevented from occurring between the seal lip and the tapered surface of the backup ring.

When the surface is designed so as to gradually increase in curvature radius from the rounded surface E of the first boundary 26, such that the relationship (curvature radius D1)>(curvature radius D2)>(curvature radius of D3) is maintained, a boundary is then formed where the surface D of the tapered part gently changes to the surface B of the protruding part, and it is therefore unlikely for extremely curved parts to be present.

Embodiments of the present invention were described above with reference to the accompanying drawings, but the specific configuration is not limited to these embodiments, and the present invention incorporates variations and additions that do not deviate from the scope of the present invention.

The invention claimed is:

1. A seal device having a backup ring protruding towards a fluid storage chamber so as to enclose a rotating shaft, wherein at least said backup ring has a tapered shape, and a distal end of a seal lip supported by the backup ring is capable of coming into contact with the rotating shaft; said seal device characterized in that: said backup ring has a protruding part, a tapered part and a distal end part extending continuously from a fixed part thereof; a rounded surface having a curvature radius (R-1) is formed at least in a first boundary where a surface of said tapered part changes to a surface of said distal end; and a rounded surface having a curvature radius (R-3) is formed in a second boundary where a surface of said protruding part changes to a surface of said tapered part; and the surface of said tapered part is a convex surface having a substantially constant curvature radius (R-2) greater than the curvature radius (R-1) of said first boundary; and the curvature radius (R-2) of said tapered part is the same curvature radius as the curvature radius (R-3) of said second boundary.

2. The seal device according to claim 1, wherein said backup ring has said protruding part extending continuously from said fixed part thereof, wherein the surface of said protruding part is substantially parallel to said rotating shaft.

3. The seal device according to claim 1, wherein an inside end surface substantially parallel to the rotating shaft is formed in the distal end of said backup ring; and a rounded surface having a curvature radius (R-0) less than that of the rounded surface having said curvature radius (R-1) is formed in the boundary where the surface of said distal end changes to said inner end surface.

4. The seal device according to claim 3, wherein an inside surface of the seal lip, which is supported by said backup ring having the protruding part, the tapered part, and the distal end part extending continuously from the fixed part, is formed in advance, at least when said seal lip is molded, as a concave surface to fit with the convex surface of the tapered part of said backup ring.

5. The seal device according to claim 2, wherein an inside end surface substantially parallel to the rotating shaft is formed in the distal end of said backup ring; and a rounded surface having a curvature radius (R-0) less than that of the rounded surface having said curvature radius (R-1) is formed in the boundary where the surface of said distal end changes to said inner end surface.

6. The seal device according to claim 5, wherein an inside surface of the seal lip, which is supported by said backup ring having the protruding part, the tapered part, and the distal end part extending continuously from the fixed part, is formed in advance, at least when said seal lip is molded, as a concave surface to fit with the convex surface of the tapered part of said backup ring.

* * * * *